(12) United States Patent
Chevallier et al.

(10) Patent No.: US 8,374,382 B2
(45) Date of Patent: Feb. 12, 2013

(54) DEVICE FOR PROCESSING VIDEO IMAGES, VIDEO PROJECTION SYSTEM AND SIGNAL INTENDED FOR USE BY THE PROJECTION SYSTEM

(75) Inventors: Louis Chevallier, La Meziere (FR); Pascal Bourdon, Le Grand Fougeray (FR); Didier Doyen, La Bouexiere (FR)

(73) Assignee: Thomson Licensing, Boulogne-Billancourt (FR)

(*) Notice: Subject to any disclaimer, the term of this patent is extended or adjusted under 35 U.S.C. 154(b) by 1132 days.

(21) Appl. No.: 11/999,120

(22) Filed: Dec. 4, 2007

(65) Prior Publication Data

US 2008/0137963 A1   Jun. 12, 2008

(30) Foreign Application Priority Data

Dec. 6, 2006 (FR) .................................. 06 55339

(51) Int. Cl.
G06K 9/00 (2006.01)
G06K 9/34 (2006.01)
G06K 9/46 (2006.01)
G06K 9/66 (2006.01)
G06K 9/20 (2006.01)
G06K 9/36 (2006.01)

(52) U.S. Cl. ........ 382/100; 382/103; 382/164; 382/190; 382/282

(58) Field of Classification Search .................. None
See application file for complete search history.

(56) References Cited

U.S. PATENT DOCUMENTS 7,302,162 B2 * 11/2007 Beaton ........................... 386/224
7,362,336 B2 *  4/2008 Miller et al. ................... 345/589

FOREIGN PATENT DOCUMENTS

EP   1237369 A2   9/2002
EP   1294189 A2   3/2003

OTHER PUBLICATIONS

French Search Report dated Jul. 20, 2007.

* cited by examiner

*Primary Examiner* — Tom Y Lu
*Assistant Examiner* — Thomas Conway
(74) *Attorney, Agent, or Firm* — Tutunjian & Bitetto, P.C.

(57) ABSTRACT

The present invention relates to a processing device of a sequence of video images intended to be displayed by a digital cinema projection system, a projection system for the digital cinema and a video signal designed to be used by such a system. The use of an anti-camcorder method against copying films is generally carried out entirely in the digital cinema projection system. However, this method requires complex video processing and costly means in the projection system. According to the invention, it is proposed to carry out part of the video processing at the level of the post-production of the video sequence and to save the result of this "pre-processing" in the form of metadata. The remaining part of the video processing is carried out from this metadata in the video projection system.

9 Claims, 3 Drawing Sheets

Figure 1:
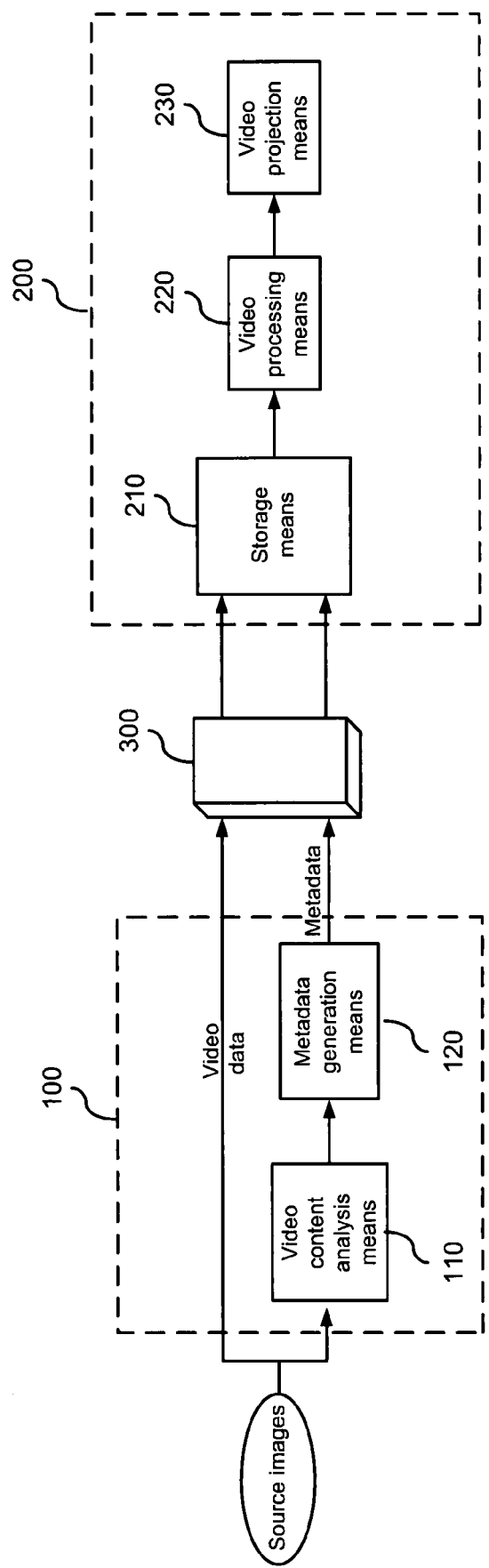

DEVICE FOR PROCESSING VIDEO IMAGES, VIDEO PROJECTION SYSTEM AND SIGNAL INTENDED FOR USE BY THE PROJECTION SYSTEM

This application claims the benefit, under 35 U.S.C. §119 of French Patent Application 0655339, filed Dec. 6, 2006.

1. SCOPE OF THE INVENTION

The present invention relates to a processing device of a sequence of video images intended to be displayed by a digital cinema projection system, a projection system for the digital cinema and a video signal designed to be used by such a system.

2. TECHNOLOGICAL BACKGROUND

Visual contents, whether fixed or moving images, are generally creations that benefit from guarantees of exclusivity related to the copyright. In general, they can only be reproduced within a strictly defined framework that enables the authors and their entitled parties to be remunerated.

In order to ensure that these legal rules are correctly observed, many systems have been developed to prevent illegal copies or to deteriorate their quality sufficiently to render them unusable. Within this framework, a method and a device aiming to fight against the copying of images by scene when they are displayed, for example by a camcorder in a cinema venue, were described in the patent application WO 05/027529. The method proposed in this patent application plans to modulate the colour (or chrominance) of the pixels of a pattern to display at a high frequency that makes the pattern invisible to the human eye but generates artifacts on the sequence filmed by the camcorder. Such a solution requires doubling at least the display frequency of the images so that the modulation is not visible. In practice, this procedure, called anti-camcorder method in the rest of the description, consists for example of decomposing each source image into two complementary images and doubling the display frequency such that the display of these two images is perceived as a single image (corresponding to the source image) by the human eye. Complementary image is understood to mean an image in which the colour of some pixels (representing an anti-copy pattern or message) is modified, the resulting colour of these pixels, after integration of the two complementary images, is the colour of the pixel of the initial source image.

Such an anti-camcorder method requires that the number of images displayed is at least twice the number of initial source images. This operation can only be carried out at the level of the projection system itself to be compliant with DCI (Digital Cinema Initiatives) recommendations for digital cinema.

Other anti-camcorder methods based on metamerism and using at least one fourth primary colour to display the images are also known. Such a method is revealed in the patent application WO 2004/040899. The use of such a method requires converting the source images defined in 3 primary colours into images defined into a larger number of primary colours, for example 4 primary colours. As with the anti-camcorder method described previously, this processing of the source images is currently carried out in the projection system in real time (at the time of display).

This video processing is relatively complex and can give rise to a significant increase in the cost of the projection system.

3. SUMMARY OF THE INVENTION

One purpose of the invention is to propose a method allowing the video processing to be carried out in the projection system to be simplified to reduce the video processing means necessary for the implementation of the anti-camcorder method in the projection system.

According to the invention, it is planned to carry out part of the video processing at the level of the post-production of the video sequence and to save the result of this "pre-processing" in the form of metadata. The remaining part of the video processing is carried out from this metadata in the video projection system.

The present invention relates to a device for processing a sequence of source images intended to be displayed by a video projection system remarkable in that it comprises analysis means to analyse the content of a sequence of source images and generation means to generate, from the result of this analysis, metadata relating to an anti-copy pattern to insert by the vision projection system into the said source images.

The analysis means are used to identify source image areas where the anti-copy pattern can be inserted. The results of this analysis are then used to generate the metadata defining the anti-copy pattern to insert.

According to a first embodiment, the analysis means are designed to detect homogenous areas of colour in the source images.

According to a second embodiment, the analysis means are designed to detect homogenous zones of luminance in the source images.

Preferably, the analysis means detects the homogenous zones having a sufficient surface (greater than a threshold value), for example a surface greater than the size of a character of the anti-copy message to insert in the images.

Moreover, the analysis means preferably detects the homogenous zones of colour having a colour corresponding to a point in the colour space that is distant from the boundaries of this space so that, in the case of inserting an anti-copy pattern by colour modulation, the amplitude of the modulation can be sufficient.

In the case of an insertion of an anti-copy pattern by luminance modulation, the analysis means preferably detects the homogenous zones having a luminance value distant from the minimum and maximum displayable values.

The metadata generated is for example the following information:
- the position of the zones detected by the detection means,
- the size of the zones detected by the detection means,
- the orientation of the zones detected by the detection means, The metadata can also be binary information indicating, for each pixel of the source images, whether the said pixel is to be modified to insert the anti-copy pattern. Preferably, the metadata also includes the amplitude of the modulation to apply to the pixels of the zones detected in the case of insertion of the anti-copy pattern by modulation of the luminance or colour of the pixels.

The metadata can also be information on several bits indicating, for each pixel of the source images, whether the said pixel is to be modified to insert the anti-copy pattern and the amplitude of the modification to apply.

The invention also relates to a video projection system designed to receive the source images and the corresponding metadata produced by the processing device defined previously. This system comprises storage means for storing the source images and the metadata, image processing means for inserting the anti-copy pattern into the source images and generate the modified video images, and projection means for displaying the modified video images.

According to a first embodiment, the image processing means are suitable to insert the anti-copy pattern into the source images processed by modulation of the luminance and/or colour of the pixels of the said images.

According to a second embodiment, the image processing means are suitable to insert the anti-copy pattern by modifying the three colour components of the video signal of the source images and by adding a complementary colour component, the visual content of the images being unchanged with respect to the source images processed. In this embodiment, the projection means can include a first projector to display the three colour components of the modified source images and a second projector to display the complementary colour component.

The invention also relates to a signal intended to be used by a projection system comprising video data relating to a sequence of video images to display by the said projection system and metadata relating to an anti-copy pattern to insert into the said sequence of video images.

The invention also relates to a method for processing a sequence of source images to be displayed by a video projection system, comprising the following steps:

analyse the content of the source images, and generate, from the results of the analysis, metadata relating to an anti-copy pattern to insert into the source images by the video projection system.

4. LIST OF FIGURES

Figure 2A:
Figure 2B:
Figure 2C:
Figure 3:
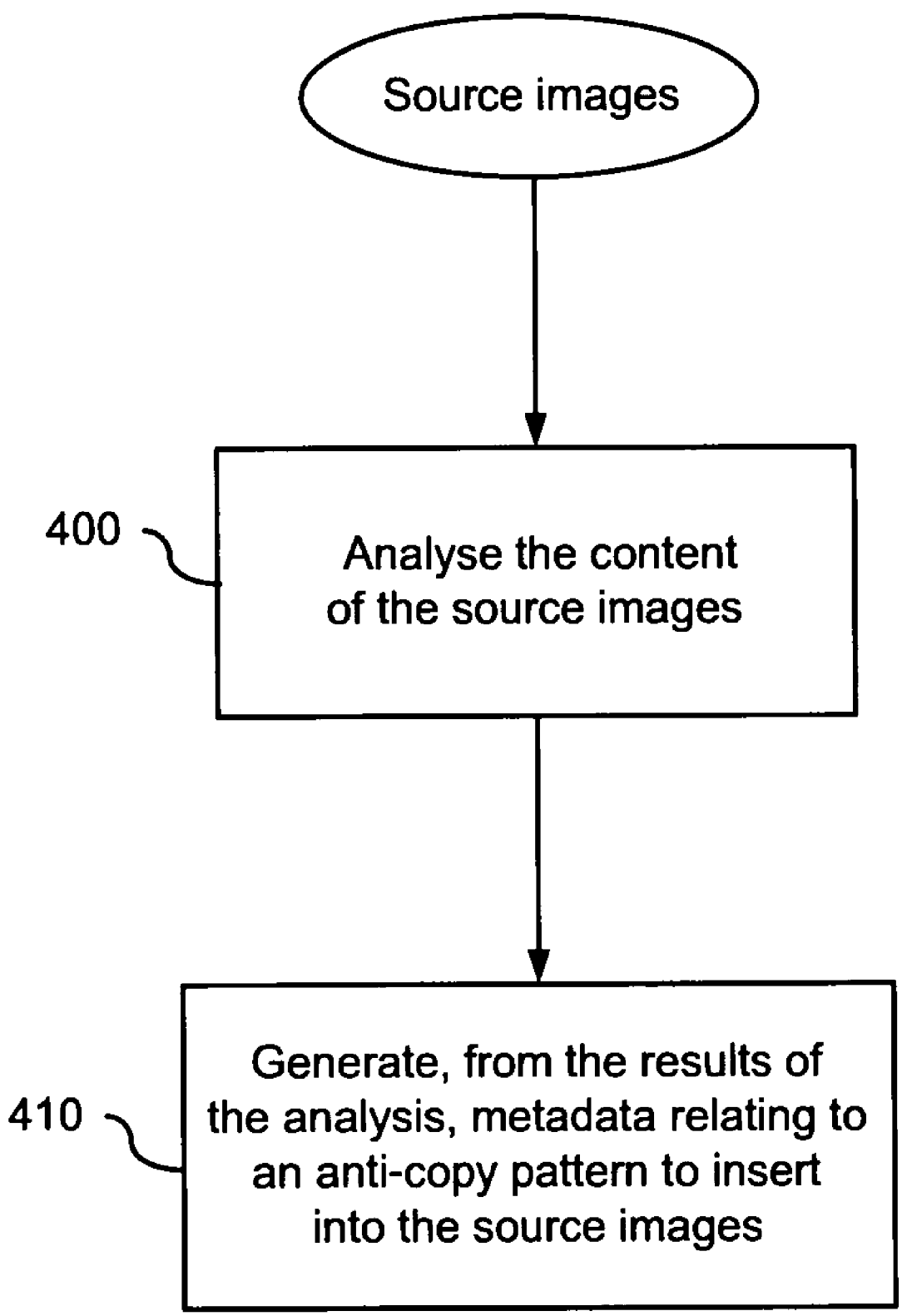

The invention will be better understood upon reading the following description, provided as a non-restrictive example and referring to the annexed drawings wherein:

FIG. 1 is a diagram showing a device for processing source images and a projection system for displaying the images processed by the processing device in accordance with the invention, FIGS. 2A and 2B illustrate the processing carried out by the processing device of FIG. 1 and FIG. 2C illustrates the processing carried out by the projection system of FIG. 1, and FIG. 3 shows the steps of the method according to the invention.

5. DETAILED DESCRIPTION OF THE INVENTION

In order for an anti-camcorder method such as the one of those presented in the preamble of the present patent application to generate artifacts that are as visible as possible on the sequence filmed by a camcorder without disturbing the perception of the spectator present in the cinema theatre, it is important that the anti-copy pattern is defined according to the content of the images to protect. For example, the pattern must be positioned in at least one area of the image noticeably homogeneous in colour or luminance (i.e. without high spatial or temporal frequencies) so that it is as visible as possible on the copy filmed by the camcorder. It is also preferable that the zone detected is sufficiently extended to contain all or part of the anti-copy pattern.

In the case of inserting the anti-copy pattern by modulation of the colour of the pixels of the image, it is also preferable that this zone has a colour in the space of the colours that is distant from the borders of this space so that the modulation is possible.

In the case of inserting the anti-copy pattern by modulation of the luminance of the pixels of the image, it is also preferable that the zone detected has a luminance value sufficiently distant from the minimum and maximum luminance values so that the modulation is possible.

According to the invention, it is proposed to carry out this type of processing at the level of the post-production of the sequence of images and to transmit the results of this processing in the form of metadata, jointly with the video data of the image sequence, to the projection system to reduce the quantity of video processing to be carried out in the projection system.

FIG. 1 shows a source image processing device 100 and a projection system 200 in accordance with the invention. The processing device 100 comprises analysis means 110 of the content of the source images and metadata generation means 120 relating to an anti-copy pattern to insert by the projection system 200 in the source images.

The analysis carried out by the means 110 can vary according to the anti-camcorder method implemented in the projection system. However, irrespective of the method used, the anti-copy pattern is preferably inserted into one or more homogeneous image zones of colour or luminance (i.e. zones not having high spatial frequencies), these zones remaining homogeneous over several images (i.e. zones not having high temporal frequencies either).

Advantageously, the analysis means 110 only detects the zones having a surface greater than a threshold surface. For example, they only detect the zones having a surface greater than the size of the anti-copy pattern to insert or, if the anti-copy pattern is a warning message, to the size of a letter or word of the message.

In the case of insertion of an anti-copy pattern by modulation of the colour of certain pixels of the image, it is important that the colour of the zone detected corresponds to a point of the space of the colours XYZ that is distant from the border of this space so that the modulation around this colour can be carried out with a maximum amplitude oscillating between a colour at the border of the space and another colour that may also be at the border of this space. Consequently, advantageously, the analysis means 110 only detects that the zones having a colour corresponding to a point of the colour space that is distant by at least a minimum distance from the borders of this space. This minimum distance is for example equal to half of the maximum amplitude of modulation required.

In the case of insertion of the anti-copy pattern by modulation of the luminance of certain pixels of the image, it is important that the luminance value of the zone detected is distant by a minimum distance from minimum (0) and maximum (255 for coding luminance values on 8 bits) displayable values. Consequently, in this case, the analysis means 110 advantageously only detects the zones having a luminance value contained in a reduced level of luminance, for example [30-225] in order to have a significant and efficient modulation. The minimum distance thus being equal to 30.

In the case of insertion of the anti-copy pattern by conversion of the 3 colour video signal of the source images into a 4 colour signal, it is also important that the colour of the zone detected corresponds to a point of the space of the colours XYZ that is distant from the border of this space so that a modulation around this colour can be carried out with sufficient non-null amplitude. Consequently, advantageously, the analysis means 110 only detects the zones having a colour corresponding to a point of the colour space that is distant from the borders of this space.

This analysis is illustrated by FIGS. 2A and 2B. FIG. 2A is a source image representing a woman's face on a partly uniform background. If one applies a detection of zones having a homogeneous colour or luminance and a predetermined sufficient size, one obtains for example the zone delimited by a white line in FIG. 2B and corresponding to the background zone located to the left of the face of the woman.

The zones thus detected are processed by the generation means 120 to generate the metadata that will then be supplied to the projection system 200 jointly with the video data of the source images. The metadata can either be data referring indirectly to the anti-copy pattern to insert, for example data referring to zones detected suitable for receiving the anti-copy pattern (in this case, it is the projection system 200 that chooses in a more precise manner the place where the anti-copy pattern is to be inserted in these zones), or data referring directly to the anti-copy pattern by defining the pixels of the image to modify.

In the first case, the metadata is for example the following information:
the position of the zones detected by the analysis means, and/or
the size of the zones detected by the analysis means, and/or
the orientation of the zones detected by the analysis means.

In the second case, the metadata is for example an item of binary information indicating for each pixel of the source images whether the said pixel is to be modified for the insertion of the anti-copy pattern. In this case, according to a variant of the invention, the metadata is coded in run length code to reduce the quantity of data to transmit.

In the third case, the metadata is for example information on several bits indicating for each pixel of the source images whether the said pixel is to be modified for the insertion of the anti-copy pattern and the amplitude of the modification. In this case, according to a variant of the invention, the metadata is also coded in run length code to reduce the quantity of data to transmit.

Advantageously, the metadata also comprises information defining the amplitude of the modulation to apply to pixels of the detected zones (first case) or to the pixels of the anti-copy pattern (second case) for insertion of the anti-copy pattern by modulation of the luminance or colour of the pixels. This amplitude is determined according to the value of luminance or colour (chrominance) of the detected zone. For example, the further the chrominance value of the detected zone is from the borders of the colour space used, the higher can be the amplitude of modulation.

The metadata thus generated and the video data of the source images are saved to a digital support 300 that is for example symbolizing a hard disk that physically contains the video data. In the place of the digital support, it is also possible to have a satellite transmission of the video data and metadata.

This data and metadata are supplied to the projection system 200 to insert the anti-copy pattern in the source images and display the resulting images. The projection system 200 comprises storage means 210 to store the video data and the metadata derived from the digital support, processing means 220 to modify the video data and insert into it an anti-copy pattern by basing itself on the metadata received and a projection device 230 to display the modified video images.

The processing means 220 insert the anti-copy pattern in the source images by using the information contained in the metadata.

If the metadata defines the position, the size, the orientation of the homogenous colour or luminance zones, the means 220 inserts the anti-copy pattern into these zones by modifying the state of some pixels of these zones, the size and orientation being dependent on the size and orientation of these zones.

If the metadata directly define the pixels to modify to insert the anti-copy pattern, the means 220 inserts the anti-copy pattern by acting only on the pixels identified by the metadata.

If the insertion of the anti-copy pattern is carried out by a modulation of colour or luminance and if the metadata supply the amplitude of the modulation to apply, the means 220 modulates the pixels with this amplitude. Otherwise, the means 220 itself defines this amplitude.

FIG. 2C illustrates the insertion of an anti-copy pattern (the message "illegal copy") in the source image of the detected zone in FIG. 2B. The source images thus modified are displayed by the projection device 230.

Naturally, if the ant-camcorder method needs to multiply the display frequency by a factor at least equal to 2 so that the pattern is invisible to the human eye, the processing means 220 is responsible for multiplying the number or source images.

In terms of system architecture, the projection system means 200 can be divided in several manners:
the storage means 210 and the video processing means 220 are included in a multimedia server and the projection means 230 are included in a projection device, or
only the storage means 210 are included in a multimedia server and the projection means 230 and the video processing means 220 are included in a projection device.

These two architectures are suitable for the case where the insertion of the anti-copy pattern is carried out by colour or luminance modulation of certain pixels of the image. The first architecture is perhaps more suitable to the case wherein the anti-copy pattern is inserted using a fourth primary colour and wherein the display of the images is carried out using two separate projectors, a first projector displaying the three standard primary colours Red, Green and Blue and the second projector displaying the additional colour. In this case, the processing means 220 that is contained in the multimedia server sends three video streams (one for each primary colour) to the first projector and a fourth video stream to the second projector.

The invention also relates to a method for processing a sequence of source images intended to be displayed by a video projection system. The steps of the method are shown in FIG. 3. This method includes an analysis step 400 of the content of the source images, and a generation step 410, from the results of the analysis, of metadata relating to an anti-copy pattern to insert into the source images by the video projection system.

Of course the invention is not limited to the embodiments previously described. In particular, those skilled in the art can use other anti-camcorder methods than those based on colour or luminance modulation or on an image of 4 primary colours. Likewise, the purpose of the invention is to reduce the video processing in the projection system, it is unnecessary to generate and transmit all the metadata (position, size, orientation, modulation amplitude) described here. It is sufficient that some of the metadata is generated upstream from the projection system then sent to this system so that the purpose can be achieved.

The invention claimed is:

1. Device for processing a sequence of source images intended to be displayed by video projection system, wherein it comprises
a processing device configured to:

detect homogeneous zones of colour in the source images, and define an anti-copy pattern such that it can be inserted in one of detected homogenous zones of the source images by the video projection system and such that said anti-copy pattern has a surface lower than a surface of said one homogeneous zone, and;

wherein the projection system is configured to insert said defined anti-copy pattern in said one homogeneous zone.

2. Device according to claim 1, wherein the processing device is further configured to detect homogeneous colour zones having a specific colour being, in a colour space, distant by at least a minimum distance from the borders of the said space.

3. Device according to claim 1, wherein the processing device is further configured to detect homogeneous colour zones having homogenous luminance zones.

4. Device according to claim 3, wherein the homogenous luminance zones have a luminance value that is distant by at least a minimum distance from minimum and maximum displayable values.

5. Video projection system intended to receive a sequence of source images, wherein the video projection system comprises a storage device configured to receive and store the source images, and metadata relating to an anti-copy pattern and detected homogeneous zones of colour in the source images;

a video processor configured to insert an anti-copy pattern based on the metadata into one of the detected homogeneous zones of the source images such that said anti-copy pattern has a surface lower than a surface of said one homogeneous zone, said video processor being further configured to generate modified video images with the inserted anti-cony pattern; and a projection device configured to display the modified video images.

6. A method implemented by a processing device for processing a sequence of source images to be displayed by video projection system, wherein the method comprises the steps of:

detecting homogeneous zones of colour in the source images, defining an anti-copy pattern such that it can be inserted into one of the detected homogeneous zones of the source and such that said anti-copy pattern has a surface lower than a surface of said one homogeneous zone; and inserting the anti-copy pattern into the said one homogeneous zone of colour of the source images such as to generate modified video images.

7. The method according to claim 6, wherein the detecting of homogeneous colour zones is performed such that said homogeneous colour zones have a colour being distant, in a color space, by at least a minimum distance from the borders of said colour space.

8. The method according to claim 6, wherein the homogeneous zones of colour correspond to homogeneous luminance zones.

9. The method according to claim 8, wherein the homogenous luminance zones have a luminance value that is distant by at least a minimum distance from minimum and maximum displayable values which are displayable by the video projection system.

* * * * *